United States Patent Office 3,752,849
Patented Aug. 14, 1973

3,752,849
MANUFACTURE OF LEVULINIC ACID
Masatomi Otsuka, Naruto, Yoshio Hirose and Tsukuru Kinoshita, Tokushima, and Takesi Masawa, Naruto, Japan, assignors to Otsuka Kagaku Yakuhin Kabushiki Kaisha, Osaka-shi, Japan
No Drawing. Filed Mar. 12, 1971, Ser. No. 123,831
Claims priority, application Japan, Mar. 18, 1970, 45/23,315
Int. Cl. C07c 59/22
U.S. Cl. 260—531 R                     9 Claims

ABSTRACT OF THE DISCLOSURE

In manufacturing levulinic acid by heating furfuryl alcohol in a diluted acid for a ring-cleavage reaction to produce levulinic acid, the present process is characterized in that the reaction is conducted in the presence of a water-soluble aliphatic ketone.

---

This invention relates to a process for manufacturing levulinic acid, more particularly to an improvement in a process for manufacturing levulinic acid by ring-cleavage of furfuryl alcohol.

Levulinic acid which serves as an intermediate for producing chemicals and medicines has been used only in limited amounts, since it has been impossible to manufacture this acid in high yields and at low cost. Although it is known, for instance, to produce levulinic acid by heating starch or molasses in diluted hydrochloric acid, this method is poor in yield and is therefore unfit for industrial production. It is also proposed to heat furfuryl alcohol in water and acid such as hydrochloric acid or oxalic acid for ring-cleavage reaction to produce levulinic acid, but with this method, a polymer is likely to be produced as a by-product due to side reaction, with the result that the yield of levulinic acid is limited to about 40 to 65% at the best. Such method is therefore by no means satisfactory.

Accordingly, main object of the present invention is to overocme the above-mentioned drawbacks of conventional methods and to provide an industrially advantageous process for selectively producing levulinic acid from furfuryl alcohol in high yields with the minimum formation of a by-product.

In manufacturing levulinic acid by heating furfuryl alcohol in water and an acid selected from the group consisting of hydrochloric acid and oxalic acid for a ring-cleavage reaction to produce levulinic acid, the present process is characterized in that the reaction is conducted in the presence of a water-soluble aliphatic ketone in an amount of at least one mole per mole of the furfuryl alcohol.

The researches of the present inventors have revealed that when a water-soluble aliphatic ketone is present in the reaction system, levulinic acid can be selectively obtained in a high order of yield with effective inhibition to undesired side reaction to produce polymer as a by-product. In accordance with the present invention, in fact, levulinic acid can be produced in high yields of at least 85%, substantially free from formation of a by-product.

The ketone to be used in this invention includes water-soluble aliphatic ketones, the representatives thereof being represented by the formula

wherein $R^1$ and $R^2$ are an aliphatic hydrocarbon radical having 1 to 5 carbon atoms and both $R^1$ and $R^2$ may be joined together at their ends to form an alicyclic ring, the carbon atoms of $R^1$ and $R^2$ being 2 to 6 in total number. Examples of the ketones are acetone, methyl ethyl ketone, diethyl ketone, methyl isobutyl ketone, cyclohexanone and the like, among which methyl ethyl ketone and diethyl ketone are particularly preferable. These water-soluble aliphatic ketones may be used alone, or at least two of them may be used in mixture, the amount of the ketones used being at least one mole per mole of furfuryl alcohol. The use of the water-soluble aliphatic ketone serves to effectively suppress the formation of an undesired polymer, ensuring selective production of levulinic acid in high yields. When used in an amount less than one mole per mole of furfuryl alcohol, the ketone fails to effectively suppress the formation of a polymer, resulting in a low yield of levulinic acid. Generally, it is preferably to use the ketone in an amount of 5 to 15 moles, most preferably of 5 to 9 moles per mole of furfuryl alcohol, though the use of a greater amount of ketone will not exert any adverse effect on the reaction.

In general, the acid to be used in this invention is hydrochloric acid or oxalic acid. Generally, it is suitable to use such acid in an amount range of 1 to 1.5 moles per mole of furfuryl alcohol. Water is also added to the reaction system in an amount of 10 to 25 moles per mole of furfuryl alcohol.

In accordance with a preferred embodiment of this invention, furfuryl alcohol is subjected to ring-cleavage reaction with heating under the reflux of an azeotropic mixture of aliphatic ketone, acid and water to produce levulinic acid. For example, to a mixture of aliphatic ketone, acid and water which is being heated and refluxed is added dropwise furfuryl alcohol which has been diluted with the ketone as desired, or while aliphatic ketone is being refluxed, furfuryl alcohol diluted with the ketone is added dropwise to the ketone along with acid and water to effect reaction. In the above procedures, an organic solvent having a higher boiling point than water and capable of forming an azeotropic mixture with water and ketone may be added to the reaction system with elevation of the reaction temperature in order to promote the reaction. Even when the reaction is conducted at a higher temperature because of the use of the organic solvent, the presence of ketone used in the present process ensures prevention of a side reaction which will cause polymerization of furfuryl alcohol during ring-cleavage reaction. Examples of the organic solvent are toluene, xylene, benzene, cymene and the like. These solvents may be used alone, or at least two kinds of them may be used in mixture, the amount of the solvent used being 5 to 15 moles per mole of furfuryl alcohol.

The reaction may not necessarily be carried out under reflux condition, although such method is the most preferable. For example, the reaction may be carried out at an elevated temperature of higher than 50° C., preferably 70 to 100° C. within a closed vessel.

For a better understanding of this invention, examples are given below.

EXAMPLE 1

To a mixture of 570 g. of methyl ethyl ketone, 120 g. of 35 wt. percent hydrochloric acid and 180 g. of water which was being refluxed with stirring was added dropwise over a period of 4 hours a solution prepared by diluting 80 g. of furfuryl alcohol having a purity of 98 wt. percent with 160 g. of methyl ethyl ketone. After completion of addition, the refluxing with stirring was further continued for 1 hour. Thereafter the resultant reaction mixture was subjected to distillation under reduced pressure to recover methyl ethyl ketone and hydrochloric acid and finally to obtain 86.3 g. of levulinic acid as a fraction boiling at 160 to 165° C./30 mm. Hg. The yield was 93 mole percent.

EXAMPLE 2

To 570 g. of methyl ethyl ketone which was being refluxed with stirring were added dropwise over a period of 4 hours 120 g. of 35 wt. percent hydrochloric acid, 180 g. of water and 80 g. of furfuryl alcohol having a purity of 98 wt. percent at the same time. After the addition, the reaction system was further refluxed with stirring for 1 hour. The resultant reaction mixture was subjected to distillation under reduced pressure to recover methyl ethyl ketone and hydrochloric acid and finally to obtain 83.5 g. of levulinic acid as a fraction boiling at 160 to 165° C./30 mm. Hg. The yield was 90 mole percent.

EXAMPLE 3

To a mixture of 1140 g. of diethyl ketone, 240 g. of 35 wt. percent hydrochloric acid and 360 g. of water which was being refluxed with stirring was added dropwise over a period of 4 hours a solution prepared by diluting 160 g. of furfuryl alcohol having a purity of 98 wt. percent with 320 g. of diethyl ketone. After the completion of addition, the reaction system was further refluxed with stirring for 1 hour. The resultant reaction mixture was subjected to distillation under a reduced pressure to recover diethyl ketone and hydrochloric acid and finally to obtain 158 g. of levulinic acid as a fraction boiling at 160 to 165° C./30 mm. Hg. The yield was 85.1 mole percent.

EXAMPLE 4

To a mixture of 570 g. of methyl ethyl ketone, 75 g. of oxalic acid and 180 g. of water which was being refluxed with stirring was added dropwise over a period of 4 hours 80 g. of furfuryl alcohol having a purity of 98 wt. percent diluted with 160 g. of methyl ethyl ketone. After the addition, the reaction system was further refluxed with stirring for 1 hour. The resultant reaction mixture was subjected to distillation under reduced pressure, whereby 79 g. of levulinic acid was obtained as a fraction boiling at 160 to 165° C./30 mm. Hg. The yield was 85.1 mole percent.

EXAMPLE 5

To a mixture was 320 g. of methyl ethyl ketone, 270 g. of toluene, 120 g. of 35 wt. percent hydrochloric acid and 180 g. of water which was being refluxed with stirring was added dropwise over a period of 6 hours 80 g. of furfuryl alcohol having a purity of 98 wt. percent diluted with 160 g. of methyl ethyl ketone. After completion of the addition, the reaction system was further refluxed with stirring for 1 hour. The resultant reaction mixture was subjected to distillation under a reduced pressure to recover methyl ethyl ketone, toluene and hydrochloric acid, and finally to obtain 83.5 g. of levulinic acid as a fraction boiling at 160 to 165° C./30 mm. Hg. The yield was 90 mole percent.

EXAMPLE 6

To a mixture of 1020 g. of cylohexanone, 120 g. of 35 wt. percent hydrochloric acid and 180 g. of water which was being refluxed with stirring was added dropwise over a period of 4 hours 80 g. of furfuryl alcohol having a purity of 98 wt. percent diluted with 280 g. of cyclohexanone. After the addition, the reaction system was further refluxed with stirring for 1 hour to complete the reaction. The resultant reaction mixture was subjected to distillation under a reduced pressure to recover cyclohexanone and hydrochloric acid and finally to obtain 79 g. of levulinic acid as a fraction boiling at 160 to 165° C./30 mm. Hg. The yield was 85.1 mole percent.

EXAMPLE 7

Dried hydrogen chloride gas was blown into a mixture of 570 g. of methyl ethyl ketone and 180 g. of water until 36.5 g. of hydrogen chloride was absorbed therein. The resultant mixture was refluxed with stirring, to which 80 g. of furfuryl alcohol having a purity of 98 wt. percent and 160 g. of methyl ethyl ketone were added dropwise over a period of 4 hours. After completion of the addition the reaction system was further refluxed for 1 hour. The resultant reaction mixture was subjected to distillation under reduced pressure to recover methyl ethyl ketone and hydrochloric acid and finally to obtain 86.3 g. of levulinic acid as a fraction boiling at 160 to 165° C./30 mm. Hg. The yield was 93 mole percent.

What we claim is:

1. In the manufacture of levulinic acid by heating furfuryl alcohol in water and an acid selected from the group consisting of hydrochloric acid and oxalic acid for a ring-cleavage reaction to produce levulinic acid, the process which is characterized in that said reaction is carried out in the presence of a water-soluble aliphatic ketone in an amount of at least one mole per mole of the furfuryl alcohol and water in an amount of 10–25 moles per mole of furfuryl alcohol.

2. The process according to claim 1, in which said ketone is at least one member of the formula of

wherein $R^1$ and $R^2$ are independently aliphatic hydrocarbon radicals of from 1 to 5 carbon atoms, or, taken together with the adjacent carbonyl group, represent cyclohexanone.

3. The process according to claim 2, in which said ketone is at least one member selected from the group consisting of methyl ethyl ketone and diethyl ketone.

4. The process according to claim 1, in which said ketone is used in the range of 5 to 15 moles per mole of furfuryl alcohol.

5. The process according to claim 4, in which said ketone is used in the range of 5 to 9 moles per mole of furfuryl alcohol.

6. The process according to claim 1, in which said reaction is conducted under a reflux condition.

7. The process according to claim 1, in which said ketone is used in combination with other organic solvent having a higher boiling point than water and capable of forming azeotropic mixture with water and ketone.

8. The process according to claim 7, in which said organic solvent is one member of the group consisting of toluene, xylene, benzene and cymene.

9. The process according to claim 1, in which 1 to 1.5 moles of said acid are present per mole of furfuryl alcohol.

References Cited
UNITED STATES PATENTS
2,738,367  3/1956  Redmon _____ 260—531 R LORRAINE A. WEINBERGER, Primary Examiner
R. D. KELLY, Assistant Examiner